United States Patent
Ohmura et al.

(10) Patent No.: US 12,243,668 B2
(45) Date of Patent: Mar. 4, 2025

(54) FERRITE SINTERED MAGNET, FERRITE PARTICLES, BONDED MAGNET, AND ROTATING ELECTRICAL MACHINE

(71) Applicant: TDK Corporation, Tokyo (JP)

(72) Inventors: Masashi Ohmura, Tokyo (JP); Junichi Nagaoka, Tokyo (JP); Shogo Muroya, Tokyo (JP); Takuma Abe, Tokyo (JP); Jo Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 591 days.

(21) Appl. No.: 17/598,508

(22) PCT Filed: Mar. 27, 2020

(86) PCT No.: PCT/JP2020/014323
§ 371 (c)(1),
(2) Date: Sep. 27, 2021

(87) PCT Pub. No.: WO2020/203889
PCT Pub. Date: Oct. 8, 2020

(65) Prior Publication Data
US 2022/0157498 A1    May 19, 2022

(30) Foreign Application Priority Data
Mar. 29, 2019   (JP) ................................ 2019-067849

(51) Int. Cl.
| | |
|---|---|
| *H01F 1/11* | (2006.01) |
| *C01G 49/00* | (2006.01) |
| *C04B 35/26* | (2006.01) |
| *H01F 1/10* | (2006.01) |
| *H01F 1/113* | (2006.01) |

(52) U.S. Cl.
CPC ............. *H01F 1/11* (2013.01); *C01G 49/00* (2013.01); *C04B 35/2641* (2013.01); *H01F 1/10* (2013.01); *H01F 1/113* (2013.01); *C04B 2235/3409* (2013.01); *C04B 2235/3418* (2013.01)

(58) Field of Classification Search
CPC ... H01F 1/11; H01F 1/10; H01F 1/113; C04B 35/2641; C04B 2235/3409; C04B 2235/3418
See application file for complete search history.

(56) References Cited

U.S. PATENT DOCUMENTS

| | | | |
|---|---|---|---|
| 2007/0194269 A1 | 8/2007 | Kobayashi et al. | |
| 2018/0277290 A1 | 9/2018 | Kim et al. | |
| 2019/0318856 A1 | 10/2019 | Nagaoka et al. | |
| 2020/0211743 A1* | 7/2020 | Yamamoto | H01F 1/10 |

FOREIGN PATENT DOCUMENTS

| | | |
|---|---|---|
| CN | 104230321 A | 12/2014 |
| EP | 940823 * | 9/1999 |
| JP | 2009-246243 * | 10/2001 |
| JP | 2006-104050 A | 4/2006 |
| JP | 2009-246243 A | 10/2009 |
| JP | 2012-209295 A | 10/2012 |
| WO | WO-2018/117261 A1 | 6/2018 |
| WO | WO 2018/216594 * | 11/2018 |
| WO | WO-2018/216594 A1 | 11/2018 |

OTHER PUBLICATIONS

International Preliminary Report on Patentability issued Oct. 14, 2021 in WO Patent Application No. PCT/JP2020/014323.
Zimin Wang et al., "Common Knowledge Evidence 1: Ferrite Production Process Technology," Chongqing University Press, Edition 1, 1st print, Jan. 2013, p. 117-p. 119, with partial English-language translation.

* cited by examiner

*Primary Examiner* — C Melissa Koslow
(74) *Attorney, Agent, or Firm* — Faegre Drinker Biddle & Reath LLP

(57) ABSTRACT

A ferrite sinter magnet has a ferrite phase having a magnetoplumbite-type crystal structure, and contains at least a metal element A, a metal element R, Fe, Co, Zn, and B. The element A is at least one kind of element selected from the group consisting of Sr, Ba, Ca, and Pb, and essentially includes Ca. the element R is at least one kind selected from the group consisting of Bi and rare-earth elements including Y, and essentially includes La. Atomic ratios of the metal elements satisfy the following Expressions (1) to (5), $$A_{1-r}R_r Fe_x Co_y Zn_z \quad (1)$$

$$0.40 \leq r \leq 0.70 \quad (2)$$

$$8.20 \leq x \leq 9.34 \quad (3)$$

$$0.05 \leq y \leq 0.50 \quad (4)$$

$$0 < z \leq 0.20 \quad (5)$$

The content of Si is 0 to 0.60% by mass in terms of $SiO_2$, and the content of B is 0.1-0.70% by mass in terms of $B_2O_3$.

9 Claims, 2 Drawing Sheets

FERRITE SINTERED MAGNET, FERRITE PARTICLES, BONDED MAGNET, AND ROTATING ELECTRICAL MACHINE

TECHNICAL FIELD

The present disclosure relates to a ferrite sintered magnet, ferrite particles, a bonded magnet, and a rotating electrical machine.

BACKGROUND ART

As a magnetic material that is used for a ferrite sintered magnet, Ba ferrite, Sr ferrite, and Ca ferrite which have a hexagonal crystal structure are known. As a crystal structure of these kinds of ferrite, a magnetoplumbite-type (M-type), a W-type, and the like are known. Among the types, the magnetoplumbite-type (M-type) ferrite is mainly employed as a magnetic material for motors and the like. The M-type ferrite is typically expressed by a general formula of $AFe_{12}O_{19}$.

As an index of magnetic properties of the ferrite sintered magnet, typically, a residual magnetic flux density (Br) and a coercive force (HcJ) are used. In the related art, from a viewpoint of improving Br and HcJ, it has been attempted to add various elements different from constituent elements of the ferrite. For example, in Patent Literature 1, it has been attempted to substitute a part of A-site elements with Ca and a rare-earth element (R), and to substitute a part of B-site elements with Co so as to improve the magnetic properties.

CITATION LIST

Patent Literature

Patent Literature 1: International Publication WO 2018/117261

SUMMARY OF INVENTION

Technical Problem

However, it is desired to further increase Br and HcJ at an ordinary temperature.

Here, an object of an aspect of the invention is to provide a ferrite sintered magnet excellent in Br and HcJ at an ordinary temperature.

Solution to Problem

A ferrite sintered magnet according to the invention is a ferrite sintered magnet having a ferrite phase having a magnetoplumbite-type crystal structure. The magnet contains at least a metal element A, a metal element R, Fe, Co, Zn, and B.

The metal element A is at least one kind of element selected from the group consisting of Sr, Ba, Ca, and Pb, and essentially includes Ca.

The metal element R is at least one kind of element selected from the group consisting of Bi and rare-earth elements including Y, and essentially includes La.

When an atomic ratio of the metal elements is expressed by Formula (1), in the ferrite sintered magnet, r, x, y, and z satisfy the following Expressions (2) to (5).

$$A_{1-r}R_rFe_xCo_yZn_z \quad (1)$$

$$0.40 \leq r \leq 0.70 \quad (2)$$

$$8.20 \leq x \leq 9.34 \quad (3)$$

$$0.05 < y \leq 0.50 \quad (4)$$

$$0 < z \leq 0.20 \quad (5)$$

In addition, in the ferrite sintered magnet, the content of Si is 0 to 0.60% by mass in terms of $SiO_2$, and the content of B is 0.01 to 0.70% by mass in terms of $B_2O_3$.

Here, the content of Si can be 0.01 to 0.40% by mass in terms of $SiO_2$, and the content of B can be 0.20 to 0.70% by mass in terms of $B_2O_3$.

Here, in the ferrite sintered magnet, Ca can occupy 95 atomic % or more of the metal element A.

A rotating electrical machine of the invention includes any one of the ferrite sintered magnets.

Ferrite particles according to the invention are ferrite particles having a ferrite phase having a magnetoplumbite-type crystal structure. The ferrite particles contain at least a metal element A, a metal element R, Fe, Co, Zn, and B.

The metal element A is at least one kind of element selected from the group consisting of Sr, Ba, Ca, and Pb, and essentially includes Ca.

The metal element R is at least one kind of element selected from the group consisting of Bi and rare-earth elements including Y, and essentially includes La.

When an atomic ratio of the metal elements is expressed by Formula (1), in the ferrite particles, r, x, y, and z satisfy the following Expressions (2) to (5).

$$A_{1-r}R_rFe_xCo_yZn_z \quad (1)$$

$$0.40 \leq r \leq 0.70 \quad (2)$$

$$8.20 \leq x \leq 9.34 \quad (3)$$

$$0.05 < y \leq 0.50 \quad (4)$$

$$0 < z \leq 0.20 \quad (5)$$

In addition, in the ferrite particles, the content of Si is 0 to 0.60% by mass in terms of $SiO_2$, and the content of B is 0.01 to 0.70% by mass in terms of $B_2O_3$.

Here, the content of Si can be 0.01 to 0.40% by mass in terms of $SiO_2$, and the content of B can be 0.20 to 0.70% by mass in terms of $B_2O_3$.

Here, in the ferrite particles, Ca can occupy 95 atomic % or more of the metal element A.

A bonded magnet according to the invention contains any one of the above ferrite particles.

A rotating electrical machine according to the invention includes the bonded magnet.

A ferrite sintered magnet or ferrite particles according to another aspect of the invention are a ferrite sintered magnet or ferrite particles having a ferrite phase having a magnetoplumbite-type crystal structure.

The ferrite sintered magnet or the ferrite particles contain at least a metal element A, a metal element R, Fe, Co, Zn, Si, and B, the metal element A is at least one kind of element selected from the group consisting of Sr, Ba, Ca, and Pb, and essentially includes Ca, the metal element R is at least one kind of element selected from the group consisting of Bi and rare-earth elements including Y, and essentially includes La, when an atomic ratio of the metal elements is expressed by Formula (1), r, x, y, and z satisfy the following Expressions (2) to (5), $$A_{1-r}R_rFe_xCo_yZn_z \quad (1)$$

$$0.300<r<0.800 \quad (2)$$

$$8.200<x\leq9.340 \quad (3)$$

$$0<y<0.500 \quad (4)$$

$$0<z<0.200 \quad (5)$$

the content of Si is 0.010 to 0.400% by mass in terms of $SiO_2$, and the content of B is 0.200 to 0.700% by mass in terms of $B_2O_3$.

Advantageous Effects of Invention

According to the invention, a ferrite sintered magnet and the like which are excellent in Br and HcJ at an ordinary temperature are provided.

DESCRIPTION OF EMBODIMENTS

Figure 1:
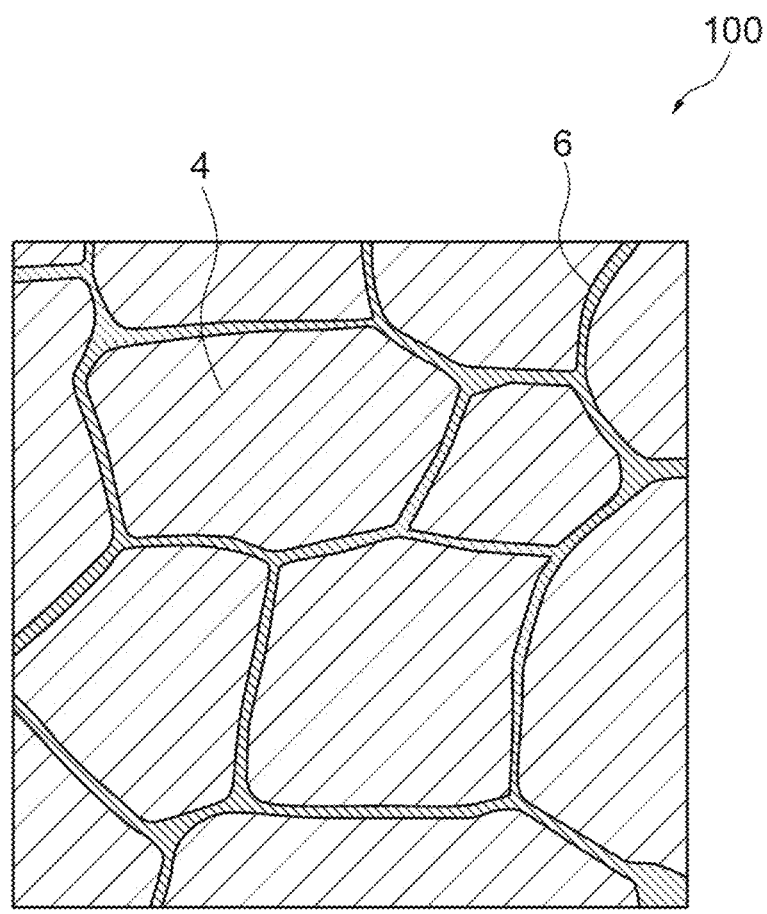
FIG. 1 is a schematic cross-sectional view of a ferrite sintered magnet.

Several embodiments of the invention will be described below in detail.

A ferrite sintered magnet and ferrite particles according to an embodiment of the invention are a ferrite sintered magnet having a ferrite phase having a magnetoplumbite-type crystal structure.

The ferrite sintered magnet and the ferrite particles contain at least a metal element A, a metal element R, Fe, Co, Zn, and B.

The metal element A is at least one kind of element selected from the group consisting of Sr, Ba, Ca, and Pb, and essentially includes Ca.

An atomic ratio of Ca in the metal element A can be 50 atomic % or more, 70 atomic % or more, 90 atomic % or more, 95 atomic % or more, 97% atomic % or more, 99 atomic % or more, or 100 atomic % or more from the viewpoint of suppressing a temperature coefficient of Br and HcJ. There is no particular limitation to a ratio of atoms other than Ca in the metal element A.

The metal element R is at least one kind of element selected from the group consisting of Bi and rare-earth elements including Y, and essentially includes La.

The rare-earth elements are yttrium (Y), scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

It is preferable that the metal element R includes one or more elements selected from the group consisting of lanthanum (La), praseodymium (Pr), and neodymium (Nd), and it is more preferable that the metal element R essentially includes La. In the metal element R, La can be 50 atomic % or more, La can be 95 atomic % or more, or La can be 99 atomic % or 100 atomic %.

In the ferrite sintered magnet and the ferrite particles according to the embodiment of the invention, when an atomic ratio of the metal elements is expressed by Formula (1), r, x, y, and z satisfy the following Expressions (2) to (5).

$$A_{1-r}R_rFe_xCo_yZn_z \quad (1)$$

$$0.40\leq r\leq0.70 \quad (2)$$

$$8.20\leq x\leq9.34 \quad (3)$$

$$0.05<y\leq0.50 \quad (4)$$

$$0<z\leq0.20 \quad (5)$$

From the viewpoint of further increasing Br and HcJ, r in General Formula (1) may be 0.45 or more. From the same viewpoint, r may be 0.60 or less, or 0.55 or less.

From the viewpoint of further increasing Br, x in General Formula (1) may be 8.3 or more, or 8.5 or more. From the viewpoint of further increasing Br and HcJ, x may be 9.3 or less, 9.2 or less, or 9.15 or less.

From the viewpoint of further increasing Br, y in General Formula (1) may be 0.45 or less, or 0.4 or less. From the same viewpoint, y in General Formula (1) may be 0.1 or more, or 0.2 or more.

From the viewpoint of further increasing Br and HcJ, z in General Formula (1) may be 0.001 or more, 0.002 or more, 0.003 or more, 0.005 or more, 0.01 or more, or 0.05 or more. From the viewpoint of increasing HcJ and the viewpoint of decreasing an absolute value of a temperature coefficient of HcJ, z in General Formula (1) may be 0.15 or less, or 0.1 or less.

The content of Si in the ferrite sintered magnet and the ferrite particles according to the embodiment of the invention is 0 to 0.60% by mass in terms of $SiO_2$, and the content may be 0.01 to 0.40% by mass, and the content of B is 0.01 to 0.70% by mass in terms of $B_2O_3$, and the content may be 0.20 to 0.70% by mass. Note that, the ferrite sintered magnet may not contain Si.

From the viewpoint of further increasing Br and HcJ, the content of Si in the ferrite sintered magnet and the ferrite particles may be, for example, 0.01% by mass or more in terms of $SiO_2$, 0.02% by mass or more, 0.05% by mass or more, 0.1% by mass or more, or 0.2% by mass or more. From the same viewpoint, the content of Si in the ferrite sintered magnet and the ferrite particles may be 0.5% by mass or less in terms of $SiO_2$, 0.4% by mass or less, or 0.35% by mass or less.

From the viewpoint of increasing Br and HcJ, the content of B in the ferrite sintered magnet and the ferrite particles may be 0.1% by mass or more, 0.2% by mass or more, 0.3% by mass or more, or 0.4% by mass or more in terms of $B_2O_3$. From the same viewpoint, the content of B may be 0.65% by mass or less, or 0.6% by mass or less.

The ferrite sintered magnet and the ferrite particles according to this embodiment may further contain another accessary component other than Bi and Si as an accessary component. For example, first, a Ca component may be contained as the accessary component. However, as described above, the ferrite sintered magnet of this embodiment contains Ca as a component that constitutes the ferrite phase that is a main phase. Accordingly, in a case where Ca is contained as the accessary component, for example, the amount of Ca which is analyzed from a sintered body becomes a total amount of the main phase and the accessary component. Accordingly, in a case where the Ca component is used as the accessary component, an atomic ratio of Ca in the metal element A in Formula (1) becomes a value that also includes the accessary component. A range of the atomic ratio of Ca is specified on the basis of a composition analyzed after sintering, and thus the range may be applied to both a case where the Ca component is contained as the accessary component and a case where the Ca component is not contained as the accessary component.

In the ferrite sintered magnet and the ferrite particles, unavoidable components derived from impurities contained in raw materials and a manufacturing facility may be contained in addition to the above-described components. Examples of the components include titanium (Ti), chromium (Cr), manganese (Mn), molybdenum (Mo), vanadium (V), and aluminum (Al). The components may be contained in the ferrite sintered magnet and the ferrite particles as each oxide, or a composite oxide. The accessary component may be segregated at a grain boundary of ferrite crystal grains in the ferrite sintered magnet to form a different phase.

A content ratio of the metal elements in the ferrite sintered magnet and the ferrite particles can be measured by a fluorescent X-ray analysis method.

The content of a metalloid element such as boron (B) and silicon (Si) in the ferrite sintered magnet and the ferrite particles can be measured by inductively coupled plasma emission spectroscopy (ICP emission spectroscopy).

FIG. 1 is a schematic cross-sectional view of a ferrite sintered magnet (ferrite particles) 100 according to the embodiment of the invention. As illustrated in FIG. 1, the ferrite sintered magnet (ferrite particles) 100 according to the embodiment of the invention includes a ferrite phase (crystal grain) 4 having a magnetoplumbite-type (M-type) crystal structure, and a grain boundary phase 6 existing between a plurality of the ferrite phases (crystal grains) 4.

The M-type ferrite has a hexagonal crystal structure. Examples of the M-type ferrite include ferrite expressed by the following Formula (III).

$$MX_{12}O_{19} \quad (III)$$

M essentially includes Ca, and may include Sr and/or Ba. M may include R. X includes Fe and may include Co and Zn.

Note that, actually, since a ratio of M (A-site) and X (B-site) in Formula (III), or a ratio of oxygen (O) shows a value that slightly deviates from the above-described range, the ratios may slightly deviate from the above-described numerical values.

From the viewpoint of sufficiently increasing magnetic properties, it is preferable that the ferrite sintered magnet and the ferrite particles have the ferrite phase 4 as a main phase. Note that, in this specification, description of "as a main phase" represents a crystal phase of which a mass ratio is the greatest in the ferrite sintered magnet and the ferrite particles. The ferrite sintered magnet and the ferrite particles may have a crystal phase (different phase) different from the main phase. A ratio of the main phase may be 70% by mass or more, 80% by mass or more, 90% by mass or more, or 95% by mass or more.

An average grain size of the ferrite phase (crystal grain) in the ferrite sintered magnet may be, for example, 5 μm or less, 4.0 μm or less, or 0.5 to 3.0 μm. When having the average grain size, a coercive force can be further increased. The average grain size of the ferrite phase (crystal grain) can be obtained by using a cross-section observation image by TEM or SEM. Specifically, after a cross-sectional area of each main phase grain on a cross-section of SEM or TEM which includes several hundred of ferrite phases (crystal grains) is obtained by image analysis, a diameter of a circle having the cross-sectional area (equivalent circle diameter) is defined as a grain size of the main phase grain on the cross-section, and a grain size distribution is measured. A number-basis average value of the grain size of the ferrite phase (crystal grain) is calculated from measured number-basis grain size distribution. The average value measured in this manner is set as the average grain size of the ferrite phase.

The grain boundary phase 6 contains an oxide as a main component. Specifically, examples of the oxide include oxides including at least one kind selected from silicon (Si), boron (B), calcium (Ca), strontium (Sr), barium (Ba), iron (Fe), manganese (Mn), Co, cobalt, chromium (Cr), zinc (Zn), and aluminum (Al), and a composite oxide of two or more among the elements. Examples of the oxide include $SiO_2$, $B_2O_3$, CaO, BaO, SrO, $Fe_2O_3$, $Co_3O_4$, ZnO, $Al_2O_3$, MnO, and $Cr_2O_3$. In addition, silicate glass may be contained. A mass ratio of the oxide can be 90% or more, 95% or more, or 97% or more.

In the cross-section of the ferrite sintered magnet, an area ratio of the grain boundary phase 6 in the sum of the ferrite phase 4 and the grain boundary phase 6 can be set to 0.1% to 5%.

A shape of the ferrite sintered magnet is not particularly limited, and can be set to various shapes such as an arc segment (C-type) shape in which a cross-section is curved to be an arc and a flat plate shape.

For example, the ferrite particles can be obtained by a pulverization process to be described later. For example, an average particle size of the ferrite particles is 0.1 to 7 μm. An average particle size of the ferrite particles can also be obtained by using an observation image of the ferrite particles by TEM or SEM in a similar manner as in the average grain size of the crystal grain of the ferrite sintered magnet. Specifically, after an area of each main phase particles in SEM or TEM which includes several hundred of ferrite particles is obtained by image analysis, a diameter of a circle having the area (equivalent circle diameter) is defined as a particle size of the ferrite particles, and a particle size distribution is measured. A number-basis average value of the particle size of the ferrite particles is calculated from a measured number-basis particle size distribution. The average value measured in this manner is set as the average particle size of the ferrite particles.

For example, a coercive force of the ferrite sintered magnet at 20° C. can be 4000 Oe or more, or can exceed 4700 Oe. A residual magnetic flux density of the ferrite sintered magnet at 20° C. can be 4000 G or more, or 4400 G or more. It is preferable that the ferrite sintered magnet is excellent in both the coercive force (HcJ) and the residual magnetic flux density (Br).

The residual magnetic flux density Br of the ferrite particles at 20° C. can be 40 emu/g or more, and the coercive force HcJ can be 3000 Oe or more.

An absolute value of a temperature coefficient of the HcJ of the ferrite sintered magnet and the ferrite particles may be 0.15 [%/° C.] or less, or 0.1[%/° C.] or less.

Here, when $HcJ_{(20° C.)}$ is set as an actual measurement value (unit: Oe) of the HcJ at 20° C., and $HcJ_{(100° C.)}$ is set as an actual measurement value (unit: Oe) of the HcJ at 100° C., the temperature coefficient β of the HcJ is defined as follows.

$HcJ$ temperature coefficient $β(\%/° C.)=[HcJ_{(100° C.)}-HcJ_{(20° C.)}]/80(° C.)/HcJ_{(20° C.)} \times 100$ (Action)

According to the ferrite sintered magnet and the ferrite particles according to this embodiment, since the metal element R, the metal element A, Fe, Co, Zn, Si, and B are contained in a predetermined range, both the coercive force and the residual magnetic flux density at 20° C. can be increased.

The reason for this is considered as follows. Since the B-site of ferrite is substituted with Zn, Br is improved. In addition, it is considered that HcJ and Br become high due to addition of the metal element R. In addition, it is considered that a structure is densified due to addition of Si and/or Ca, and thus the density is improved. In addition, it is considered that HcJ is improved due to addition of B.

In addition, according to the ferrite sintered magnet and the ferrite particles according to this embodiment, the absolute value of the temperature coefficient of the HcJ can be suppressed to be low. Particularly, there is a tendency that the smaller the ratio of Zn (for example, z is 0.1 or less) is, the smaller the temperature coefficient of the HcJ is (for example, 0.105%/° C. or less).

(Bonded Magnet)

Next, an embodiment of a bonded magnet will be described below.

The bonded magnet according to this embodiment contains the ferrite particles and a resin. Examples of the resin include thermosetting resins such as an epoxy resin, a phenol resin, a resin having polyaromatic rings, and a resin having a triazine ring (triazine resin); and thermoplastic resins such as a styrene-based elastomer, an olefine-based elastomer, a urethane-based elastomer, a polyester-based elastomer, a polyimide-based elastomer such as nylon, an ionomer, an ethylene propylene copolymer (EPM), and an ethylene-ethyl acrylate copolymer.

For example, a content ratio of the resin in the bonded magnet may be 0.5 to 10% by mass, or 1 to 5% by mass from the viewpoint of making excellent magnetic properties and an excellent shape retention property be compatible with each other. The content ratio of the resin in the bonded magnet can be adjusted by changing a resin concentration in a solution containing a resin that is used at the time of production, or a molding pressure at the time of producing a molded body. From the same viewpoint, for example, a content ratio of the ferrite particles in the bonded magnet may be 90% by mass to 99.5% by mass, or 95% by mass to 99% by mass.

A shape of the bonded magnet is not particularly limited, and can be set to a similar shape as in the ferrite sintered magnet.

The ferrite sintered magnet and the bonded magnet according to this embodiment can be used as a rotating electrical machine such as a motor and a generator, a magnet for a speaker and a headphone, a magnetron tube, a magnetic field generation device for MRI, a clamper for a CD-ROM, a sensor for a distributor, a sensor for ABS, a fuel and oil level sensor, a magnet latch, or a magnetic field generation member such as an isolator. In addition, the ferrite sintered magnet and the bonded magnet can also be used as a target (pellet) when forming a magnetic layer of a magnetic recording medium by a vapor deposition method, a sputtering method, or the like.

(Rotating Electrical Machine)

Figure 2:
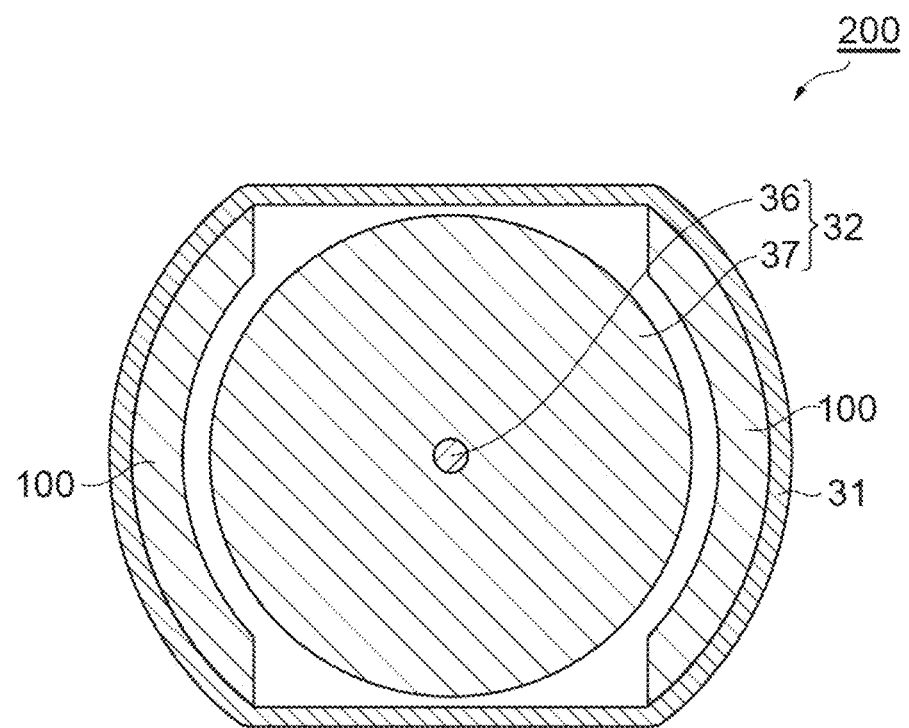
FIG. 2 is a schematic cross-sectional view illustrating an embodiment of a motor.

Continuously, a motor 200 according to an embodiment of the invention is illustrated in FIG. 2. The motor 200 includes a stator 31 and a rotor 32. The rotor 32 includes a shaft 36 and a rotor core 37. In the motor 200 of this embodiment, a C-shaped ferrite sintered magnet or bonded magnet 100 that is a permanent magnet is provided in the stator 31, and an electromagnet (coil) is provided in the rotor core 37 of the rotor 32.

Note that, with regard to a motor, the ferrite sintered magnet may be provided in the rotor, and the electromagnet (coil) may be provided in the stator. A shape of the motor is not particularly limited. In addition, other examples of the rotating electrical machine include a generator including the rotor and the stator. The ferrite sintered magnet can be provided in the rotor or the stator.

(Method of Manufacturing Ferrite Sintered Magnet)

Next, description will be given of an example of manufacturing the ferrite particles, the ferrite sintered magnet, and the bonded magnet. The manufacturing method to be described below includes a blending process, a calcination process, a pulverization process, a molding process, and a sintering process. Details of each of the processes will be described below.

The blending process is a process of preparing a mixed powder for calcination. For example, the mixed powder for calcination can contain constituent elements of ferrite, for example, the metal element A, the metal element R, Fe, Co, and Zn. In the blending process, it is preferable that a mixture of powders containing respective elements is mixed by an attritor, a ball mill, or the like for approximately 1 to 20 hours, and a pulverization process is simultaneously performed to obtain a mixed powder.

An addition element such as B and Si may be contained in the powder in advance, or an additional powder containing the addition element may be further added in the blending process to obtain a mixed powder for calcination. Examples of the additional powder include a B-containing powder, and an Si-containing powder.

Examples of a powder that contains each element include elementary substances, oxides, hydroxides, carbonates, nitrates, silicates, and organic metal compounds of each element. One powder may contain two or more metal elements, or one powder may contain substantially only one metal element.

Examples of a powder that contains Ca include $CaCO_3$ and CaO.

Examples of a powder that contains Sr include $SrCO_3$ and SrO.

Examples of a powder that contains R include $La_2O_3$ and $La(OH)_3$.

Examples of a powder that contains Fe include $Fe_2O_3$.
Examples of a powder that contains Co include $Co_3O_4$.
Examples of a powder that contains Zn include ZnO.
Examples of a powder that contains B include $B_2O_3$.
Examples of a powder that contains Si include $SiO_2$.

An average particle size of a raw material powder is not particularly limited, and is, for example, 0.1 to 2.0 μm.

After the blending process, it is preferable to dry a raw material composition and to remove coarse particles by a sieve as necessary.

In the calcination process, the raw material composition obtained in the blending process is calcined. For example, the calcination is preferably performed in an oxidizing atmosphere such as the air. For example, a calcination temperature may be 1100° C. to 1400° C., or 1100° C. to 1300° C. For example, a calcination time may be 1 minute to 10 hours, or 1 minute to 3 hours. For example, a ratio of the ferrite phase (M-phase) in a calcined powder (ferrite particles) obtained by the calcination may be 70% by mass or more or 75% by mass or more. A ratio of the ferrite phase can be obtained in a similar manner as in the ratio of the ferrite phase in the ferrite sintered magnet.

In the pulverization process, a calcined powder that has a granular shape, or a lump shape due to the calcination process is pulverized. In this manner, the ferrite particles are obtained. For example, the pulverization process may be performed in two stages including a process of pulverizing the calcinated powder to a coarse powder (coarse pulverization process), and a process of further finely pulverizing the resultant powder (fine pulverization process).

For example, the coarse pulverization can be performed until the average particle size of the pulverized powder becomes 0.1 to 5.0 μm by using a vibration mill or the like.

In the fine pulverization, a coarse powder obtained in the coarse pulverization is pulverized by a wet-type attritor, a ball mill, a jet mill, or the like. In the fine pulverization, pulverization is performed so that an average particle size of an obtained fine powder (ferrite particles) becomes, for example, approximately 0.08 to 2.0 μm. A specific surface area (obtained, for example, by a BET method) of the fine powder is set to, for example, 7 to 12 m$^2$/g. Preferable pulverization time is different in accordance with a pulverization method. For example, the pulverization time is 30 minutes to 10 hours in the case of the wet-type attritor, and is 10 to 50 hours in the case of the wet-type pulverization by the ball mill. A specific surface area of the ferrite particles can be measured by using a commercially available specific surface area measuring device (manufactured by Mountech Co., Ltd., product name: HM Model-1210).

In the fine pulverization process, in order to increase the degree of magnetic orientation of a sintered body that is obtained after sintering, for example, polyvalent alcohol expressed by a general formula of $C_n(OH)_nH_{n+2}$ may be added. n in the general formula may be, for example, 4 to 100, or 4 to 30. Examples of the polyvalent alcohol include sorbitol. In addition, two or more kinds of polyvalent alcohols may be used in combination. In addition, in addition to the polyvalent alcohol, another known dispersant may be used in combination.

In the case of adding the polyvalent alcohol, an addition amount thereof may be, for example, 0.05 to 5.0% by mass, or 0.1 to 3.0% by mass with respect to an addition target (for example, the coarse powder). Note that, the polyvalent alcohol that is added in the fine pulverization process is thermally decomposed and removed in the sintering process to be described later.

Note that, it is preferable to add a part of raw material powders, for example, a part of a $CaCO_3$ powder, and a part or the entirety of a $SiO_2$ powder in the coarse pulverization process and/or the fine pulverization process without mixing all of the raw material powders in the blending process. When adding a powder including the component after the calcination, a sintering property in the sintering process can be improved, and the magnetic properties can be improved. Note that, since the accessary components may flow out in combination with a solvent of slurry in the case of performing molding in a wet manner, the accessary components can be mixed in a content greater than a target content in the ferrite sintered magnet 100.

For example, in the case of adding a part of a Ca-containing powder after calcination, the addition amount of Ca may be 0.01% by mass or more, or 1.60% by mass or less in terms of $CaCO_3$ with respect to the entirety of the ferrite magnet.

In the molding process, the ferrite particles obtained in the pulverization process is molded in a magnetic field to obtain a molded body. Molding can be performed by either dry molding or wet molding method. From the viewpoint of increasing the degree of magnetic orientation, it is preferable to perform molding with the wet molding.

In the case of performing molding with the wet molding, for example, the above-described fine pulverization process is performed in a wet manner to obtain slurry, and the slurry is concentrated to a predetermined concentration to obtain slurry for wet molding. Molding can be performed by using the slurry for wet molding. The slurry can be concentrated by centrifugation, filter pressing, or the like. The content of the ferrite particles in the slurry for wet molding is, for example, 30 to 80% by mass. Examples of a dispersion medium for dispersing the ferrite particles in the slurry include water. A surfactant such as gluconic acid, gluconate, and sorbitol may be added to the slurry. As the dispersion medium, a non-aqueous solvent may be used. As the non-aqueous solvent, an organic solvent such as toluene and xylene can be used. In this case, a surfactant such as oleic acid may be added. Note that, the slurry for wet molding may be prepared by adding a dispersion medium or the like to the ferrite particles in a dry state after fine pulverization.

In the wet molding, molding in a magnetic field is subsequently performed with respect to the slurry for wet molding. In this case, for example, a molding pressure is 9.8 to 196 MPa (0.1 to 2.0 ton/cm$^2$). For example, a magnetic field that is applied is 398 to 1194 kA/m (5 to 15 kOe).

In the sintering (main sintering) process, the molded body obtained in the molding process is sintered to obtain the ferrite sintered magnet. Sintering of the molded body can be performed in an oxidizing atmosphere such as the air. For example, a sintering temperature may be 1050° C. to 1270° C., or 1080° C. to 1240° C. In addition, sintering time (for example, retention time at the sintering temperature) is, for example, 0.5 to 3 hours.

In the sintering process, for example, heating may be performed at a temperature rising rate of approximately 0.5° C./minute from room temperature to approximately 100° C. before reaching a sintering temperature. According to this, the molded body can be sufficiently dried before sintering progresses. In addition, the surfactant added in the molding process can be sufficiently removed. Note that, the process may be performed at the beginning of the sintering process, or may be performed separately before the sintering process.

In this manner, the ferrite sintered magnet can be manufactured. In the case of manufacturing the bonded magnet instead of the ferrite sintered magnet, the molded body obtained in the above-described molding process is impregnated with a resin, and heating is performed to cure the resin, thereby obtaining the bonded magnet. Specifically, the molded body is immersed in a resin-containing solution that is prepared in advance, and is defoamed by reducing a pressure in a hermetically sealed container, thereby causing the resin-containing solution to permeate into voids of the molded body. Then, the molded body is taken out from the resin-containing solution, and an excess resin-containing solution adhered to a surface of the molded body is removed. A centrifugal separator or the like may be used to remove the excess resin-containing solution.

Before being immersed in the resin-containing solution, when the molded body is placed in a hermitically sealed solution and is immersed in a solvent such as toluene while being maintained in a reduced pressure atmosphere, defoaming is promoted, and thus the impregnation amount of the resin can be increased, and voids in the molded body can be reduced.

The method of manufacturing the ferrite particles, the ferrite sintered magnet, and the bonded magnet is not limited to the above-described example. For example, in the case of manufacturing the bonded magnet, after performing processes up to the above-described pulverization process, the obtained ferrite particles and the resin may be mixed, and the resultant mixture may be molded in a magnetic field to obtain the bonded magnet containing the ferrite particles and the resin.

In addition, for example, the molding process and the sintering process may be performed in the following order. That is, the molding process may be performed by a ceramic injection molding (CIM) molding method or powder injection molding (PIM, a kind of powder injection molding). In the CIM molding method, first, dried ferrite particles are heated and kneaded in combination with a binder resin to form a pellet. The pellet is injection-molded in a mold to which a magnetic field is applied to obtain a preliminary molded body. The preliminary molded body is subjected to a de-binder treatment to obtain a molded body. Next, in a sintering process, for example, the molded body subjected to the de-binder treatment is sintered for approximately 0.2 to 3 hours in the air preferably at 1100° C. to 1250° C. and more preferably at a temperature of 1160° C. to 1230° C., thereby obtaining the ferrite sintered magnet.

EXAMPLES

The content of the invention will be described in more detail with reference to examples and comparative examples, but the invention is not limited to the following examples.

[Manufacturing of Ferrite Sintered Magnet]

Examples 1 to 37 and Comparative Examples 1 to 17

As raw materials, powders of calcium carbonate ($CaCO_3$), barium carbonate ($BaCO_3$), strontium carbonate ($SrCO_3$), lanthanum hydroxide ($La(OH)_3$), iron oxide ($Fe_2O_3$), cobalt oxide ($Co_3O_4$), zinc oxide (ZnO) were prepared. The raw material powders were blended in atomic ratios as in Tables 1 to 3. However, as to be described later, a part of calcium carbonate is added in the pulverization process, and thus an amount corresponding to the part was deducted. A predetermined amount of boron oxide ($B_2O_3$) was added to the blended material obtained in this manner so that an amount in the ferrite sintered magnet becomes an amount in Table 1 and Table 2, and mixing and pulverization were performed by using a wet-type attritor and a ball mill to obtain slurry (blending process). In the examples and comparative examples, a blending ratio of the raw materials was changed as shown in Table 1 and Table 2 so that ferrite sintered magnets having compositions different from each other are obtained.

After the slurry was dried and coarse particles were removed, calcination was performed at 1280° C. to obtain a calcined powder (calcination process). The obtained powder was coarsely pulverized by a small-sized rod vibration mill to obtain a coarse powder. On the basis of the mass of the ferrite sintered magnet, 0.3% by mass of silicon oxide ($SiO_2$) powder, 0.7% by mass of calcium carbide ($CaCO_3$) powder, and 1% by mass of sorbitol were added to the coarse powder. Then, the coarse powder was finely pulverized by using a wet-type ball mill to obtain slurry including ferrite particles (pulverization process).

Slurry for wet molding was obtained by adjusting the amount of moisture in the obtained slurry after fine pulverization. The slurry for wet molding was molded in an applied magnetic field of 796 kA/m (10 kOe) by using a wet-type magnetic field molding machine to obtain a molded body having a columnar shape having a diameter of 30 mm×a thickness of 15 mm (molding process). The obtained molded body was dried in the air at room temperature, and was sintered in the air at 1170° C. (sintering (main sintering) process). In this manner, ferrite sintered magnets having a columnar shape was obtained.

Examples 38 and 39

Processes were set to be similar as in Example 1 except that blending was performed to obtain a composition as in Table 3 and the sintering (main sintering) temperature was set to 1150° C.

[Evaluation 1 of Ferrite Sintered Magnet]

<Evaluation of Magnetic Properties>

Upper and lower surfaces of each ferrite sintered magnet were processed, and then Br and HcJ at 20° C. were respectively measured by using a B—H tracer in which a maximum application magnetic field is 29 kOe. In addition, with respect to some ferrite sintered magnets, HcJ at 100° C. was measured by using a vibrating sample type magnetometer, and a temperature coefficient β of HcJ was obtained.

<Composition Analysis>

The content of boron (B) and the content of silicon (Si) in the ferrite sintered magnet were measured in the following order. 0.1 g of ferrite sintered magnet sample was mixed with 1 g of sodium peroxide and 1 g of sodium carbonate, and the resultant mixture was heated and melted. The melt was dissolved in a solution of pure water of 40 ml and hydrochloric acid of 10 ml, and pure water was added to the resultant solution to obtain a solution of 100 ml. The content of boron in terms of $B_2O_3$ and the content of silicon in terms of $SiO_2$ were obtained by ICP emission spectroscopy (ICP-AES) by using the solution. In the ICP emission spectroscopy, an analysis device manufactured by SHIMADZU CORPORATION (device name: ICPS 8100CL) was used, and matrix matching was performed in measurement.

r, x, y, and z in ferrite were measured by a fluorescent X-ray analysis method.

Results are shown in Table 1 to Table 3.

TABLE 1

| | 1-r | | r | x | y | z | Content in magnet | | Magnetic properties (20° C.) | | |
| --- | --- | --- | --- | --- | --- | --- | --- | --- | --- | --- | --- |
| | | | | | | | $SiO_2$ | $B_2O_3$ | Br | HcJ | βHcJ |
| Table 1 | Ca | Ba | La | Fe | Co | Zn | (mass %) | (mass %) | (G) | (Oe) | (%/° C.) |
| Example 1 | 0.5 | 0 | 0.5 | 9.09 | 0.4 | 0.05 | 0.3 | 0.41 | 4436 | 5766 | 0.016 |
| Example 2 | 0.5 | 0 | 0.5 | 9.12 | 0.3 | 0.05 | 0.3 | 0.41 | 4464 | 5807 | 0.030 |
| Example 3 | 0.5 | 0 | 0.5 | 9.14 | 0.3 | 0.05 | 0.3 | 0.41 | 4474 | 5923 | 0.044 |
| Example 4 | 0.5 | 0 | 0.5 | 9.04 | 0.4 | 0.1 | 0.3 | 0.41 | 4431 | 4789 | 0.062 |
| Example 5 | 0.5 | 0 | 0.5 | 9.09 | 0.3 | 0.1 | 0.3 | 0.41 | 4431 | 4814 | 0.067 |
| Example 6 | 0.5 | 0 | 0.5 | 9.14 | 0.3 | 0.1 | 0.3 | 0.41 | 4424 | 5078 | 0.090 |
| Example 7 | 0.55 | 0 | 0.45 | 8.6 | 0.3 | 0 | 0.2 | 0.56 | 4429 | 4616 | 0.057 |

TABLE 1-continued

| Table 1 | 1-r Ca | r Ba | x La | y Fe | Co | z Zn | Content in magnet SiO$_2$ (mass %) | B$_2$O$_3$ (mass %) | Br (G) | HcJ (Oe) | βHcJ (%/° C.) |
|---|---|---|---|---|---|---|---|---|---|---|---|
| Example 8 | 0.45 | 0 | 0.55 | 9.34 | 0.4 | 0 | 0.02 | 0.408 | 4415 | 6027 | 0.005 |
| Example 9 | 0.5 | 0 | 0.5 | 8.3 | 0.4 | 0 | 0.3 | 0.408 | 4352 | 6501 | −0.010 |
| Example 10 | 0.5 | 0 | 0.5 | 9.14 | 0.5 | 0 | 0.02 | 0.408 | 4364 | 5821 | −0.006 |
| Comparative Example 1 | 0.5 | 0 | 0.5 | 9.09 | 0.1 | 0 | 0.3 | 0.408 | 3895 | 3659 | 0.353 |
| Example 11 | 0.5 | 0 | 0.5 | 9.14 | 0.4 | 0.18 | 0.3 | 0.56 | 4395 | 4827 | 0.063 |
| Example 12 | 0.5 | 0 | 0.5 | 9.1 | 0.4 | 0.01 | 0.3 | 0.56 | 4334 | 4047 | −0.074 |
| Example 13 | 0.5 | 0 | 0.5 | 9.1 | 0.4 | 0.01 | 0.3 | 0.56 | 4231 | 6082 | −0.105 |
| Example 14 | 0.5 | 0 | 0.5 | 9.14 | 0.4 | 0 | 0.01 | 0.41 | 4441 | 6693 | −0.013 |
| Example 15 | 0.5 | 0 | 0.5 | 9.14 | 0.4 | 0 | 0.01 | 0.41 | 4415 | 6805 | −0.012 |
| Example 16 | 0.5 | 0 | 0.5 | 9.14 | 0.4 | 0 | 0.1 | 0.41 | 4463 | 7096 | −0.022 |
| Example 17 | 0.5 | 0 | 0.5 | 9.14 | 0.4 | 0 | 0.2 | 0.41 | 4265 | 6994 | −0.014 |
| Example 18 | 0.5 | 0 | 0.5 | 9.14 | 0.4 | 0 | 0.4 | 0.41 | 4312 | 7047 | −0.030 |
| Example 19 | 0.5 | 0 | 0.5 | 9.14 | 0.4 | 0 | 0.16 | 0.2 | 4448 | 5063 | 0.036 |
| Example 20 | 0.5 | 0 | 0.5 | 9.14 | 0.4 | 0 | 0.16 | 0.35 | 4393 | 6375 | −0.001 |
| Example 21 | 0.5 | 0 | 0.5 | 9.14 | 0.4 | 0 | 0.16 | 0.53 | 4227 | 7161 | −0.033 |
| Example 22 | 0.5 | 0 | 0.5 | 9.14 | 0.4 | 0 | 0.01 | 0.7 | 4316 | 7119 | −0.047 |
| Example 23 | 0.5 | 0 | 0.5 | 8.2 | 0.3 | 0.05 | 0.3 | 0.41 | 4360 | 6550 | 0.005 |
| Example 24 | 0.5 | 0 | 0.5 | 8.2 | 0.3 | 0.05 | 0.3 | 0.41 | 4400 | 6240 | 0.017 |
| Example 25 | 0.5 | 0 | 0.5 | 8.2 | 0.3 | 0.11 | 0.3 | 0.41 | 4370 | 4740 | 0.092 |

TABLE 2

| Table 2 | 1-r Ca | r Ba | x La | y Fe | Co | z Zn | Content in Magnet SiO$_2$ (mass %) | B$_2$O$_3$ (mass %) | Br (G) | HcJ (Oe) | βHcJ (%/° C.) |
|---|---|---|---|---|---|---|---|---|---|---|---|
| Comparative Example 2 | 0.5 | 0 | 0.5 | 10.1 | 0.3 | 0.1 | 0.3 | 0.41 | 3890 | 4100 | 0.070 |
| Comparative Example 3 | 0.5 | 0 | 0.5 | 9.14 | 0 | 0.1 | 0.3 | 0.41 | 2360 | 3140 | 0.372 |
| Example 26 | 0.5 | 0 | 0.5 | 9.14 | 0.5 | 0 | 0.02 | 0.41 | 4380 | 5900 | 0.002 |
| Comparative Example 4 | 0.5 | 0 | 0.5 | 9.1 | 0.3 | 0 | 0.3 | 0.41 | 3985 | 6896 | −0.021 |
| Example 27 | 0.6 | 0 | 0.4 | 9.04 | 0.3 | 0.2 | 0.3 | 0.41 | 4440 | 4050 | 0.165 |
| Example 28 | 0.5 | 0 | 0.5 | 9.14 | 0.2 | 0.2 | 0.3 | 0.41 | 4520 | 4100 | 0.220 |
| Comparative Example 5 | 0.2 | 0 | 0.8 | 8.5 | 0.3 | 0 | 0.2 | 0.56 | 801 | 3130 | −0.270 |
| Comparative Example 6 | 0.15 | 0.1 | 0.8 | 8.85 | 0.5 | 0 | 0.2 | 0.04 | 3544 | 6418 | −0.095 |
| Comparative Example 7 | 0.7 | 0 | 0.3 | 9.2 | 0.3 | 0 | 0.2 | 0.04 | 4170 | 3090 | 0.254 |
| Example 29 | 0.5 | 0 | 0.5 | 9.14 | 0.4 | 0 | 0 | 0.41 | 4470 | 6050 | 0.034 |
| Example 30 | 0.5 | 0 | 0.5 | 9.14 | 0.4 | 0 | 0.6 | 0.41 | 4009 | 5179 | −0.023 |
| Comparative Example 8 | 0.5 | 0 | 0.5 | 9.14 | 0.4 | 0 | 0.7 | 0.41 | 3908 | 4893 | −0.048 |
| Example 31 | 0.5 | 0 | 0.5 | 9.14 | 0.4 | 0 | 0.16 | 0.19 | 4512 | 4730 | 0.070 |
| Example 32 | 0.5 | 0 | 0.5 | 9.14 | 0.4 | 0 | 0.16 | 0.7 | 4134 | 5264 | −0.102 |
| Comparative Example 9 | 0.55 | 0 | 0.45 | 10 | 0.1 | 0.1 | 0.45 | 0.11 | 4329 | 2087 | 0.574 |
| Comparative Example 10 | 0.55 | 0 | 0.45 | 9.81 | 0.1 | 0.1 | 0.475 | 0.11 | 4520 | 2170 | 0.515 |
| Comparative Example 11 | 0.55 | 0 | 0.45 | 9.81 | 0.1 | 0.1 | 0.5 | 0.11 | 4329 | 2198 | 0.527 |
| Comparative Example 12 | 0.55 | 0 | 0.45 | 9.81 | 0.1 | 0.1 | 0.525 | 0.11 | 4236 | 2329 | 0.498 |
| Comparative Example 13 | 0.45 | 0 | 0.55 | 10.6 | 0.1 | 0.27 | 0.55 | 0.11 | 4570 | 2550 | 0.447 |
| Comparative Example 14 | 0.55 | 0 | 0.45 | 9.5 | 0.1 | 0.13 | 0.875 | 0.11 | 4465 | 3650 | 0.255 |

TABLE 2-continued

| Table 2 | 1-r Ca | r Ba | x La | y Fe | Co | z Zn | Content in Magnet SiO$_2$ (mass %) | B$_2$O$_3$ (mass %) | Magnetic properties (20° C.) Br (G) | HcJ (Oe) | βHcJ (%/° C.) |
|---|---|---|---|---|---|---|---|---|---|---|---|
| Comparative Example 15 | 0.55 | 0 | 0.45 | 9.5 | 0.1 | 0.13 | 1 | 0.11 | 4457 | 3343 | 0.308 |
| Comparative Example 16 | 0.55 | 0 | 0.45 | 9 | 0.1 | 0.13 | 1.1 | 0.11 | 4392 | 3336 | 0.319 |
| Comparative Example 17 | 0.45 | 0 | 0.55 | 10.6 | 0.1 | 0.25 | 0.6 | 0.11 | 4587 | 2261 | 0.444 |
| Comparative Example 18 | 0.2 | 0 | 0.8 | 9.34 | 0.4 | 0 | 0.1 | 0.41 | 2805 | 3465 | −0.171 |
| Example 33 | 0.3 | 0 | 0.7 | 9.14 | 0.4 | 0 | 0.1 | 0.41 | 4139 | 5688 | −0.050 |
| Example 34 | 0.4 | 0 | 0.6 | 9.14 | 0.4 | 0 | 0.1 | 0.41 | 4384 | 6387 | −0.012 |
| Example 35 | 0.45 | 0.1 | 0.5 | 9.14 | 0.4 | 0 | 0.1 | 0.41 | 4400 | 4452 | 0.078 |
| Example 36 | 0.5 | 0 | 0.5 | 9.16 | 0.1 | 0.18 | 0.3 | 0.41 | 4250 | 4001 | 0.255 |
| Example 37 | 0.5 | 0 | 0.5 | 8.2 | 0.3 | 0.05 | 0.2 | 0.01 | 4226 | 4020 | 0.1 |

TABLE 3

| Table 3 | Atomic ratio 1-r A Ca | Sr | r R La | x Fe | y Co | z Zn | Content in magnet SiO$_2$ (mass %) | B$_2$O$_3$ (mass %) | Magnetic properties (20° C.) Br (G) | HcJ (Oe) | Temperature coefficient β 20 to 100° C. HcJ (%/° C.) |
|---|---|---|---|---|---|---|---|---|---|---|---|
| Example 38 | 0.50 | 0.10 | 0.40 | 9.16 | 0.23 | 0.050 | 0.30 | 0.40 | 4408 | 4810 | 0.10 |
| Example 39 | 0.50 | 0.00 | 0.50 | 9.04 | 0.36 | 0.050 | 0.30 | 0.40 | 4431 | 4789 | −0.06 |

As shown in Tables 1 to 3, in ferrite magnets which satisfy Expressions (2) to (5) and in which the content of Si and the content of B are within predetermined ranges, Br and HcJ at 20° C. were excellent. In addition, particularly, an absolute value of the temperature coefficient β of HcJ in a case where Zn was less (for example, z is 0.1 or less) could also be suppressed to be low (for example, 0.105%/° C. or less).

In addition, ferrite sintered magnets of Comparative Example 10, Examples 11, 24, and 28 were pulverized to obtain particles having an average particle size of approximately 10 μm, Br and HcJ at 20° C. and HcJ at 100° C. were measured by using a vibrating sample type magnetometer as described above, and the temperature coefficient β of HcJ was obtained. Results are shown in Table 4. Even in a particle state, Br and HcJ at 20° C. were excellent, and in a case where Zn was less, the absolute value of the temperature coefficient β of HcJ could be suppressed to be particularly low.

TABLE 4

| Table 4 | 1-r Ca | r Ba | x La | y Fe | Co | z Zn | Content in magnet particles SiO$_2$ (mass %) | B$_2$O$_3$ (mass %) | Magnetic properties (20° C.) Br (emu/g) | HcJ (Oe) | Temperature coefficient β 20 to 100° C. HcJ (%/° C.) |
|---|---|---|---|---|---|---|---|---|---|---|---|
| Comparative Example 10 | 0.55 | 0 | 0.45 | 9.81 | 0.11 | 0.10 | 0.475 | 0.11 | 37.03 | 1939 | 0.373 |
| Example 11 | 0.50 | 0 | 0.50 | 9.14 | 0.36 | 0.18 | 0.30 | 0.56 | 40.08 | 3580 | 0.004 |
| Example 24 | 0.50 | 0 | 0.50 | 8.20 | 0.30 | 0.05 | 0.30 | 0.41 | 42.61 | 4144 | 0.010 |
| Example 28 | 0.50 | 0 | 0.50 | 9.14 | 0.16 | 0.20 | 0.30 | 0.41 | 43.40 | 3048 | 0.177 |

REFERENCE SIGNS LIST

4: ferrite phase (main phase), 6: grain boundary phase, 31: stator (stator cover), 32: rotor, 36: shaft, 37: rotor core, 100: ferrite sintered magnet or bonded magnet, 200: motor.

The invention claimed is:

1. A ferrite sintered magnet having a ferrite phase having a magnetoplumbite-type crystal structure, containing:
   at least a metal element A, a metal element R, Fe, Co, Zn, and B,
   wherein the metal element A is at least one kind of element selected from the group consisting of Sr, Ba, Ca, and Pb, and essentially includes Ca,
   the metal R is at least one kind selected from the group consisting of Bi and rare earth elements including Y, and essentially includes La,
   when an atomic ratio of the metal elements is expressed by Formula (1),
   r, x, y, and z satisfy the following Expressions (2) to (5), $$A_{1-r}R_rFe_xCo_yZn_z \quad (1)$$

$$0.40 \leq r \leq 0.70 \quad (2)$$

$$8.20 \leq x \leq 9.34 \quad (3)$$

$$0.05 \leq y \leq 0.50 \quad (4)$$

$$0.01 \leq z \leq 0.10 \quad (5)$$

a content of Si is 0-0.60% by mass in terms of $SiO_2$,
the content of B is 0.1-0.70% by mass in terms of $B_2O_3$, and
a coercive force HcJ of the ferrite sintered magnet is 4000 Oe or more.

2. The ferrite sintered magnet according to claim 1, wherein the content of Si is 0.01 to 0.40% by mass in terms of $SiO_2$, and the content of B is 0.20 to 0.70% by mass in terms of $B_2O_3$.

3. The ferrite sintered magnet according to claim 1, wherein Ca occupies 95 atomic % or more of the metal element A.

4. A rotating electrical machine comprising:
   the ferrite sintered magnet according to claim 1.

5. Ferrite particles having a ferrite phase having a magnetoplumbite-type crystal structure, containing:
   at least a metal element A, a metal element R, Fe, Co, Zn, and B,
   wherein the metal element A is at least one kind of element selected from the group consisting of Sr, Ba, Ca, and Pb, and essentially includes Ca,
   the metal R is at least one kind selected from the group consisting of Bi and rare-earth elements including Y, and essentially includes La,
   when an atomic ratio of the metal elements is expressed by Formula (1),
   r, x, y, and z satisfy the following Expressions (2) to (5), $$A_{1-r}R_rFe_xCo_yZn_z \quad (1)$$

$$0.40 \leq r \leq 0.70 \quad (2)$$

$$8.20 \leq x \leq 9.34 \quad (3)$$

$$0.05 \leq y \leq 0.50 \quad (4)$$

$$0.01 \leq z \leq 0.10 \quad (5)$$

a content of Si is 0-0.60% by mass in terms of $SiO_2$,
the content of B is 0.1-0.70% by mass in terms of $B_2O_3$, and
a coercive force HcJ of the ferrite particles in the form of a ferrite sintered magnet is 4000 Oe or more.

6. The ferrite particles according to claim 5, wherein the content of Si is 0.01 to 0.40% by mass in terms of $SiO_2$, and the content of B is 0.20 to 0.70% by mass in terms of $B_2O_3$.

7. The ferrite particles according to claim 5, wherein Ca occupies 95 atomic % or more of the metal element A.

8. A bonded magnet containing:
   the ferrite particles according to claim 5.

9. A rotating electrical machine comprising:
   the bonded magnet according to claim 8.

* * * * *